United States Patent [19]

Mullis

[11] 4,275,872
[45] Jun. 30, 1981

[54] CLAMPING APPARATUS

[76] Inventor: Charles Mullis, Rte. 6, Box 603, Monroe, N.C. 28110

[21] Appl. No.: 78,226

[22] Filed: Sep. 24, 1979

[51] Int. Cl.³ .............................................. B23Q 3/00
[52] U.S. Cl. ....................................... 269/72; 269/77; 269/315; 403/385; 403/389; 403/399
[58] Field of Search ...................... 269/315, 45, 71, 73, 269/72, 77; 33/169 R; 248/124, 229; 24/256, 257, 263 DB, 68 C, 81 H, 81 CR, 115 G; 403/389, 391, 399, 385, 400

[56] References Cited

U.S. PATENT DOCUMENTS

| | | | |
|---|---|---|---|
| 1,239,233 | 9/1917 | Trowbridge | 269/77 |
| 2,267,583 | 12/1941 | Carroll | 248/229 |
| 2,456,003 | 12/1948 | Knutson | 269/72 X |
| 2,709,565 | 5/1955 | Tovsignant | 248/124 |
| 2,817,546 | 12/1957 | Benes | 403/385 |
| 3,096,109 | 7/1963 | Callahan | 403/385 |
| 3,581,354 | 6/1971 | Usiskin | 248/229 |
| 3,827,686 | 8/1974 | Storkh | 269/315 |
| 4,030,718 | 6/1977 | Philipoff | 269/315 |

Primary Examiner—Robert C. Watson
Attorney, Agent, or Firm—Bell, Seltzer, Park & Gibson

[57] ABSTRACT

A clamping apparatus is provided which is adapted to selectively secure two elongate members in a predetermined positional relationship. The apparatus includes a U-shaped clamping block, with an opening receiving a mounting post therethrough. A second opening extends through the arms of the clamping block, and a bolt-like clamping member is disposed through the second opening and has a knob threadedly positioned thereon. The head of the clamping member is slotted and includes a third opening receiving a stop rod therethrough. Also, cooperating frusto-conical surfaces are provided in the second opening of the clamping block and adjacent the head of the clamping member, whereby the tightening of the knob on the clamping member serves to concurrently clamp the post in the opening of the clamping block and the rod in the opening in the head of the clamping member.

8 Claims, 6 Drawing Figures

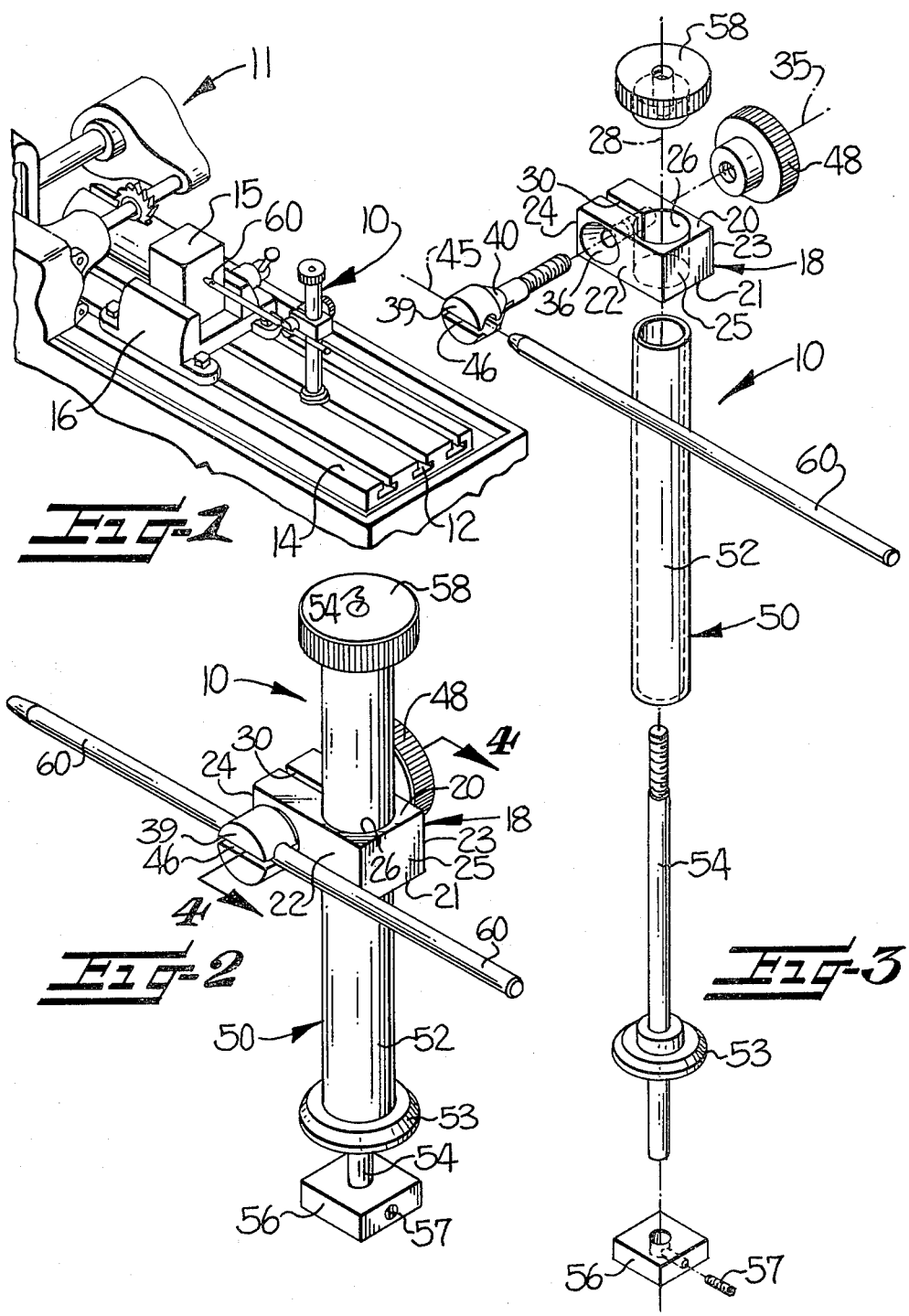

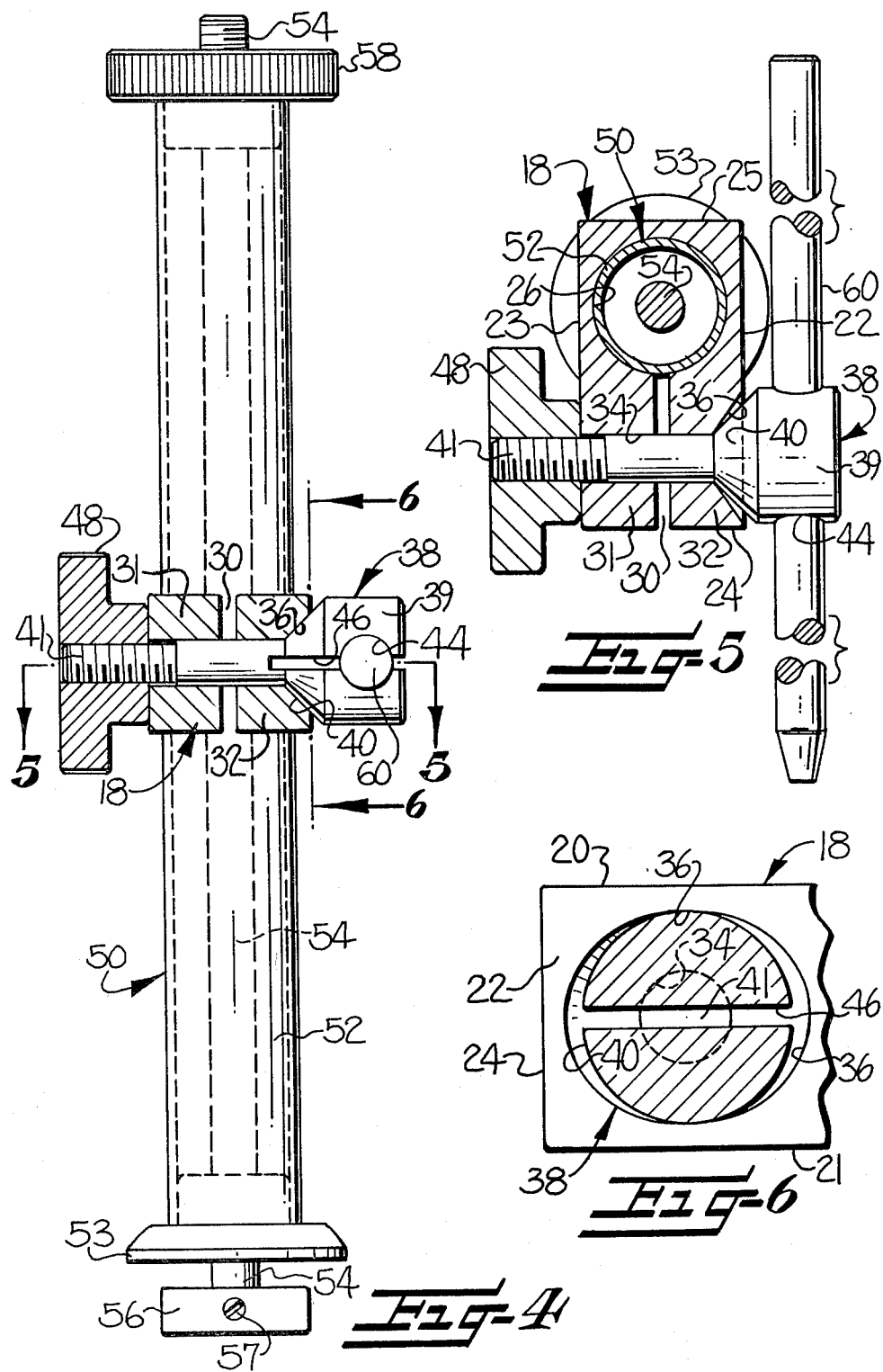

CLAMPING APPARATUS

The present invention relates to a clamping apparatus for securing two elongate members or rods in a preselected positional relationship.

Apparatus of the above general type have heretofore been proposed for positioning and holding various devices, such as a gauge, pointer, camera, or other similar instrument, at a desired location. One such prior apparatus comprises a bifurcated clamping member which engages one rod, and which is operatively closed onto the rod by tightening a bolt which passes through the arms or jaws of the clamping member. The clamping member further has a boss adjustably fixed thereto for receiving the second rod, and a set screw or the like is provided in the boss for directly engaging and locking the second rod, note for example British Pat. No. 552,840. This construction is not seen to be totally satisfactory however since two separate locking actions are required to secure the two rods, which greatly complicates the locking action, particularly where the two rods must be carefully held in a desired position while being locked together, or where repeated readjustment is required.

In another known apparatus, the head of the bolt for the clamping member is in the form of a ring which receives the second rod, so that the tightening of the bolt also serves to draw the ring and thus the second rod against the side of the clamping member and thereby lock it in position, note for example the U.S. patent to Callahan, U.S. Pat. No. 3,096,109. Other similar devices are shown in the U.S. Pat. Nos. to Carroll, 2,267,583; Tousignant, 2,709,565; and Benes, 2,817,546. While each of these devices have a common locking member for clamping and releasing both rods, the locking mechanism in each case is seen to be of relatively complex construction.

It is accordingly an object of the present invention to provide an apparatus for securing two elongate members or rods in a preselected positional relationship, and wherein the two rods may be locked together by the actuation of a single member, to thereby facilitate the initial setting and subsequent readjustment of the two rods with respect to each other, and which is of relatively simple construction.

It is another object of the present invention to provide a clamping apparatus of the described type wherein the two rods are each held by a broadly applied clamping action, to provide a firm engagement while avoiding damage to the surface of the rods.

It is a more specific object of the present invention, and in accordance with the specific illustrated embodiment, to provide an apparatus for locating successive workpieces on a milling machine or the like, and which may be readily attached to the mill table, and readily adjusted into a desired configuration for engaging the successive workpieces.

These and other objects and advantages of the present invention are achieved in the embodiment illustrated herein by the provision of a clamping apparatus which comprises a clamping block having a generally U-shaped configuration which is defined by an opening extending therethrough at the bight of the U, and a pair of parallel clamping arms formed by the free ends of the U. A second opening extends transversely through the two arms in a direction perpendicular to the axis of the first opening, and a clamping member is disposed through the second opening. The clamping member has a head at one end, and is externally threaded at the other end, and the head has a third opening extending transversely therethrough and an axially directed slot which communicates with the third opening. An elongate post is adapted to be received in the first opening of the clamping block, and an elongate rod is adapted to be received in the opening in the head of the clamping member, and a knob is threadedly received on the threaded end of the clamping member. In addition, cooperating surface means is provided on the clamping block and the clamping member for closing the slot and thereby clamping the rod in the opening of the head of the clamping member when the clamping member is drawn into the second opening by the tightening of the knob. Thus the tightening of the knob serves to concurrently clamp the post in the first opening and the rod in the opening in the head of the clamping member.

In the preferred embodiment, the cooperating surface means comprises a frusto-conical recess at the end of the second opening in the clamping block, a frusto-conical shoulder positioned on the clamping member adjacent the head, and with the slot extending substantially through the frusto-conical shoulder. Also, one of the recess and shoulder preferably has a slightly elliptical cross-sectional outline, while the other of the recess and shoulder has a generally circular cross-sectional outline. By this arrangement, the slot in the head of the clamping member may be more effectively closed to clamp the rod in the opening thereof when the slot of the clamping member is specifically oriented with respect to the elliptical surface.

Some of the objects having been stated, other objects will appear as the description proceeds, when taken in connection with the accompanying drawings in which FIG. 1 is a fragmentary perspective view of a conventional milling machine having an apparatus of the present invention operatively mounted thereto;

FIG. 2 is a perspective view of the apparatus of the present invention;

FIG. 3 is an exploded perspective view of the apparatus;

FIG. 4 is a partly sectioned side elevation view of the apparatus;

FIG. 5 is a sectional plan view taken substantially along the line 5—5 of FIG. 4; and FIG. 6 is a fragmentary sectional elevation view taken substantially along the line 6—6 of FIG. 4.

Referring more specifically to the drawings, an apparatus embodying the present invention is indicated generally at 10. The apparatus 10 as illustrated is particularly designed for use as a work stop or locator on a milling machine 11. More particularly, the apparatus 10 is illustrated in FIG. 1 mounted in a T-slot 12 of the work table 14, and as will be apparent to those skilled in the art, the apparatus 10 is positioned so as to permit the machine operator to accurately and quickly locate successive workpieces 15 in the mounting bracket 16. While in the illustrated embodiment the apparatus 10 is particularly designed for use with a milling machine, it will be understood that the novel features of the present invention are applicable to a variety of other uses where two elongate members or rods are releasably interconnected in a desired positional relationship.

The apparatus 10 comprises a clamping block 18 having parallel top and bottom faces 20, 21, parallel side faces 22, 23, and parallel end faces 24, 25. In addition, a first cylindrical opening 26 extends through the block perpendicularly to the top and bottom faces and defines a first axis 28. A slot 30 extends from the end face 24, to the first opening 26 and is disposed in a plane which is perpendicular to the top and bottom faces and includes the axis 28. Also, the slot 30 serves to define a pair of spaced apart locking jaws or arms 31, 32 disposed on respective sides thereof, note FIG. 5. Viewed in plan, the clamping block 18 has a generally U-shaped configuration, with the first opening 26 extending therethrough at the bight of the U, and with the arms 31, 32 being formed by the free ends of the U.

The clamping block further includes a second opening 34 which extends through the arms 31, 32 to define a second axis 35 which extends in a direction perpendicular to the plane of the slot 30. The second opening 34 is generally cylindrical, and includes a generally frusto-conical recess 36 at one end thereof.

A bolt-like clamping member 38 is disposed through the second opening 34, and includes a head 39 at one end, a generally frusto-conical shoulder 40 adjacent the head, and a threaded opposite end portion 41. As best seen in FIGS. 4-6, the frusto-conical shoulder 40 of the clamping member is received within the frusto-conical recess 36 of the opening in the clamping block.

The clamping member 38 further includes a third cylindrical opening 44 which extends transversely through the head to define a third axis 45. Further, as best seen in FIG. 4, a transverse slot 46 extends axially through the head 39 and the frusto-conical shoulder 40 of the member. The transverse slot 46 passes through the third opening 44 and defines a plane which includes the third axis. A nut in the form of a hand knob 48 is also provided which is threadedly received on the threaded end of the clamping member 38.

An elongate mounting post 50 extends through the first opening, and includes means for releasably attaching the same in the T-slot 12 of the milling machine table 14 or the like. More particularly, the mounting post 50 includes an elongate tubular member 52 having a radial flange 53 fixed by a force fit or the like to the lower end as seen in FIGS. 2 and 3. The means for releasably attaching the mounting post in the slot 12 comprises a draw rod 54 which extends coaxially through the tubular member 52, and extends axially beyond each end thereof. The draw rod 54 is of a diameter to freely slide through the opening of the tubular member and the radial flange 53. Also, a stop plate 56 having a square outline is fixed by a set screw 57 or the like at the free end of the draw rod adjacent the flange 53, and is sized to be held against rotation when disposed in the slot 12. A hand operable locking member or knob 58 is threadedly received on the other free end of the draw rod. The locking knob 58 is normally positioned to contact the upper end of the tubular member 52, whereby rotation of the locking knob 58 acts to move the stop plate 56 axially toward and away from the radial flange 53 of the tubular member. By this arrangement, the horizontal edges of the T-slot 12 in the work table may be gripped between the stop plate 56 and radial flange 53, to secure the apparatus 10 in an upright position on the table 14.

The apparatus 10 further comprises a stop rod 60 received through the opening 44 in the head of the clamping member. In the illustrated embodiment, the rod 60 is normally disposed in a horizontal direction and is used to quickly and accurately locate successive workpieces 15 in the mounting bracket 16 of the milling machine.

The frusto-conical recess 36 and the frusto-conical shoulder 40 will be seen to constitute cooperating surface means for closing the slot 46 and thereby clamping the rod 60 in the opening 44 when the clamping member 38 is drawn into the second opening 34 by the tightening of the knob 48. Thus as will be apparent, the tightening of the knob 48 serves to concurrently clamp the post 50 in the first opening 26 and the rod 60 in the third opening 44.

Viewing FIGS. 5 and 6, it will be noted that the frusto-conical recess 36 has a slightly elliptical cross-sectional outline, with the shorter diameter thereof extending vertically as illustrated. Also, the frusto-conical shoulder 40 is generally circular in cross-sectional outline. The fact that the frusto-conical recess 36 has a shorter dimension in the vertical direction, permits the recess to more effectively clamp the two bifurcated portions of the head 39 toward each other and thereby clamp the rod 60 in the opening 44, when the slot 46 and rod 60 are disposed substantially horizontally, which is the normal orientation in the case of the illustrated embodiment. However, if the clamping member 38 were to be rotated so that the opening 44 and rod 60 extended vertically, the short dimension portion of the frusto-conical recess 36 would abut the frusto-conical shoulder 40 at the ends of the slot 46 upon the tightening of the knob 48, and little if any closing of the slot would be effected. It should also be noted that the elliptical surface could be positioned on the frusto-conical shoulder 40, with the longer diameter disposed perpendicular to the slot 46, and with the frusto-conical recess 36 being circular in cross-section. This latter configuration would permit the clamping force to be equally effective in any orientation of the clamping member or rod.

In the drawings and specification, there has been set forth a preferred embodiment of the invention, and although specific terms are employed, they are used in a generic and descriptive sense only and not for purposes of limitation.

That which is claimed is:

1. An apparatus for selectively securing two members in a predetermined positional relationship, and characterized by the ability to permit the ready release and resecurement of the two members in a new positional relationship, and comprising a generally U-shaped clamping block having a first opening extending therethrough at the bight of the U, a pair of parallel clamping arms formed by the free ends of the U, and a second opening extending transversely through said two arms in a direction generally perpendicular to the axis of said first opening, a clamping member disposed through said second opening and having a head at one end, an externally threaded portion at the other end, a third opening extending transversely through said head, and an axially directed slot extending through said head and disposed to include the axis of said third opening, a post received in said first opening, means for releasably securing said post in an upright position to a slot in a supporting surface, a rod received in said third opening, a nut threadedly received on said threaded end of said clamping member, and cooperating surface means on said clamping block and said clamping member for closing said slot and thereby clamping said rod in said third opening when the clamping member is drawn into the second opening by the tightening of said nut, and whereby the tightening of the nut serves to concurrently clamp the post in said first opening and said rod in said third opening.

2. The apparatus as defined in claim 1 wherein said post and said rod are each cylindrical, and said first opening and said third opening each have a cylindrical outline which is sized to closely conform to said post and rod respectively.

3. The apparatus as defined in claim 1 wherein said cooperating surface means comprises a frusto-conical recess at the end of said second opening adjacent said head of said clamping member, and a frusto-conical shoulder on said clamping member adjacent said head, and with said slot extending substantially through said frusto-conical shoulder.

4. The apparatus as defined in claim 3 wherein one of said frusto-conical recess and frusto-conical shoulder have a slightly elliptical cross-sectional outline, and the other of said recess and shoulder have a generally circular cross-sectional outline.

5. The apparatus as defined in claim 4 wherein said frusto-conical recess is elliptical in cross-sectional outline, and whereby said slot may be closed to effectively clamp said rod in said third opening only when the plane of said slot is substantially aligned with the longer dimension of the cross-sectional outline of said frusto-conical recess.

6. An apparatus for locating successive workpieces on a milling machine or the like and characterized by the ability to be readily mounted on the machine and adjusted into a desired configuration, and comprising a clamping block having parallel top and bottom faces, opposite side faces, and opposite end faces, said block further having a first opening extending through said block perpendicularly to said top and bottom faces and defining a first axis, a slot disposed in a plane perpendicular to said top and bottom faces and including said first axis, said slot extending from one end face to said first opening to define a pair of spaced apart arms disposed on respective sides of said slot, a second opening extending through said arms of said block to define a second axis which extends perpendicularly to the plane of said slot, said second opening including a generally frusto-conical recess at one end thereof, a clamping member having a head at one end, a generally frusto-conical shoulder adjacent the head, and a threaded opposite end portion, said clamping member being disposed through said second opening of said clamping block with the frusto-conical shoulder being received within said frusto-conical recess of said second opening, said clamping member further having a third opening extending transversely through said head to define a third axis, and a transverse slot extending axially through said head and at least a substantial portion of said frusto-conical shoulder thereof, with said transverse slot defining a plane which includes said third axis, one of said frusto-conical recess and frusto-conical shoulder having a slightly elliptical cross-sectional outline, and the other of said surface and shoulder having a generally circular cross-sectional outline, a mounting post extending through said first opening, and including means for releasably attaching the same in a slot in a milling machine table or the like, a stop rod extending through said third opening, and a knob threadedly received on said threaded end of said clamping member, whereby the tightening of said knob serves to concurrently clamp said post in said first opening and clamp said stop rod in said third opening.

7. The apparatus as defined in claim 6 wherein said mounting post comprises an elongate tubular member having a radial flange fixed at one end thereof, and wherein said means for releasably attaching said mounting post in a slot comprises a draw rod extending coaxially and slideably through said tubular member and extending axially beyond each end thereof, a stop plate fixed at the free end of said draw rod adjacent said radial flange, and a locking member threadedly received on the other free end of said support rod, whereby rotation of said locking member acts to move said stop plate axially toward or away from said radial flange of said tubular member.

8. A clamping apparatus adapted for selectively securing two elongate members in a predetermined positional relationship, and characterized by the ability to permit the ready release and resecurement of the two members in a new positional relationship, and comprising a generally U-shaped clamping block having a first opening extending therethrough at the bight of the U and adapted to receive a first elongate member therethrough, a pair of parallel clamping arms formed by the free ends of the U, and a second opening extending transversely through said two arms in a direction generally perpendicular to the axis of said first opening, a clamping member disposed through said second opening and having a head at one end, an externally threaded portion at the other end, a third opening extending transversely through said head and adapted to receive a second elongate member therethrough, and an axially directed slot extending through said head and disposed to include the axis of said third opening, a nut threadedly received on said threaded end of said clamping member, and cooperating surface means on said clamping block and said clamping member for closing said slot and thereby being adapted to clamp the second elongate member in said third opening when the clamping member is drawn into the second opening by the tightening of said nut, and whereby the tightening of the nut is adapted to concurrently clamp the first elongate member in said first opening and the second elongate member in said third opening, and wherein said cooperating surface means comprises a frusto-conical recess at the end of said second opening adjacent said head of said clamping member, and a frusto-conical shoulder on said clamping member adjacent said head, and with said slot extending substantially through said frusto-conical shoulder, and wherein one of said frusto-conical recess and frusto-conical shoulder have a slightly elliptical cross-sectional outline, and the other of said recess and shoulder have a generally circular cross-sectional outline.

* * * * *